(12) United States Patent
Capozzi

(10) Patent No.: US 9,819,166 B1
(45) Date of Patent: Nov. 14, 2017

(54) WEATHER-PROOF JUNCTION BOX WITH PAN FOR CIRCUIT BOARD

(71) Applicant: Stephen J. Capozzi, Eau Claire, WI (US)

(72) Inventor: Stephen J. Capozzi, Eau Claire, WI (US)

(*) Notice: Subject to any disclaimer, the term of this patent is extended or adjusted under 35 U.S.C. 154(b) by 0 days.

(21) Appl. No.: 15/341,114

(22) Filed: Nov. 2, 2016

Related U.S. Application Data

(60) Provisional application No. 62/250,050, filed on Nov. 3, 2015.

(51) Int. Cl.
| | |
|---|---|
| *H02G 3/08* | (2006.01) |
| *H02G 3/14* | (2006.01) |
| *H02G 3/18* | (2006.01) |
| *H05K 5/02* | (2006.01) |

(52) U.S. Cl.
CPC ............ *H02G 3/088* (2013.01); *H02G 3/085* (2013.01); *H02G 3/14* (2013.01); *H02G 3/18* (2013.01); *H05K 5/0247* (2013.01)

(58) Field of Classification Search
USPC .......................................................... 174/50
See application file for complete search history.

(56) References Cited

U.S. PATENT DOCUMENTS

| | | | | |
|---|---|---|---|---|
| 4,917,345 A | * | 4/1990 | Czech ...................... | F16M 7/00 248/237 |
| 6,343,439 B1 | * | 2/2002 | Rutledge ............. | E04D 13/1471 248/148 |
| 6,942,189 B2 | | 9/2005 | Capozzi et al. | |
| 7,626,118 B1 | | 12/2009 | Capozzi | |

* cited by examiner

*Primary Examiner* — Dhirubhai R Patel
(74) *Attorney, Agent, or Firm* — Tipton L. Randall

(57) ABSTRACT

A curb and cap junction box assembly protecting joined electrical conductors includes a curb member with a planar flashing and central housing extending upwardly from the flashing, forming an enclosed space. The central housing has top and bottom openings. A plate, secured over the bottom opening has a knockout section and a mounting pan for circuit boards. A cap member has a planar top and peripheral edge extending downward. The cap member reversibly fastens over the top opening of the central housing. The junction box assembly is secured to a structure by the flashing and receives an electrical conductor from the structure through the knockout aperture in the plate member. The electrical conductor extends through the top opening of the central housing and under the downward extending peripheral edge of the cap member and outside the junction box assembly. The junction box provides enclosure for high voltage applications.

12 Claims, 5 Drawing Sheets

WEATHER-PROOF JUNCTION BOX WITH PAN FOR CIRCUIT BOARD

CROSS-REFERENCE TO RELATED APPLICATIONS, IF ANY

This application claims the benefit under 35 U.S.C. §119 (e) of provisional application Ser. No. 62/250,050, filed 3 Nov. 2015. Application Ser. No. 62/250,050 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a device for protecting electrical conductor connections. More particularly, the present invention relates to a structure curb and cap assembly for protecting electrical conductor connections, the assembly containing a pan device for mounting a circuit board control there within. Most particularly, the present invention relates to a structure curb and cap assembly for protecting exterior electrical conductor connections that prevents water from penetrating the structure, yet is readily accessed for future work on such connected conductors and circuit board, once the structure curb and cap assembly is installed.

2. Background Information

With the recent increase in generation of electricity using solar panels, the routing of electrical power from the panels to the electrical grid via electrical conductors is required. Because the solar panels are located in the open, often atop a roof or similar structure, providing a secure electrical conductor between the panels and the electrical grid is required. Such connections require protection from the elements, yet must be easily accessible for maintenance proposes.

Applicant has devised a curb and cap junction box assembly enclosure for such electrical conductor connections and provides protection from the elements, yet is easily accessible for maintenance proposes. In addition, the junction box assembly contains a mounting device designed to accommodate a circuit board for monitoring and controlling various components of the system.

SUMMARY OF THE INVENTION

The invention is directed to a curb and cap junction box assembly for joined electrical conductors. The junction box assembly comprises a curb member, including a planar flashing portion with a central housing portion extending upwardly from the flashing portion and forming an enclosed space. The central housing portion has top and bottom openings. A plate member, which has a top side facing the bottom opening of the central housing portion, is secured over the bottom opening of the central housing portion. The plate member includes at least one knockout section removable from the plate member, to provide at least one aperture therein. A ground block member is fastened to the top side of the plate member and positioned within the enclosed space of the central housing portion. A pan member is also mounted to the plate member for mounting a circuit board, used for monitoring and controlling various components of the system. A cap member includes a planar top portion and a peripheral edge portion extending downwardly therefrom. The cap member is sized to fit over the top opening of the central housing portion and reversibly fastened thereto. The curb and cap junction box assembly is secured to a structure by the planar flashing portion. The assembly receives an electrical conductor from interior the structure, through an aperture formed in the plate member by removal of the at least one knockout section. The electrical conductor extends into the enclosed space therein, and through the top opening of the central housing portion of the curb member. The conductor is further routed under the downward extending peripheral edge portion of the cap member and extends exterior the curb and cap junction box assembly.

In a further embodiment of the invention, the curb and cap mounting assembly includes a notch, adjacent the central housing portion top opening, and a gasket member, secured interior the cap member. The gasket member contacts the notch in the central housing portion to seal the opening. Additionally, a strain relief clip is secured to the plate member and positioned within the enclosed space of the central housing portion.

In yet a further embodiment of the invention, the plate member including a rail member secured to the top side thereof. The rail member is adapted for mounting at least one circuit breaker thereto. The cap member also includes at least one U-shaped cut out, extending from the downwardly extending peripheral edge portion of the cap member toward the planar top portion thereof. The at least one U-shaped cut out is adapted for providing clearance for at least one conduit, with an electrical conductor therein, extending from the central housing portion of the curb member.

DESCRIPTION OF THE EMBODIMENTS

Nomenclature

Figure 1:
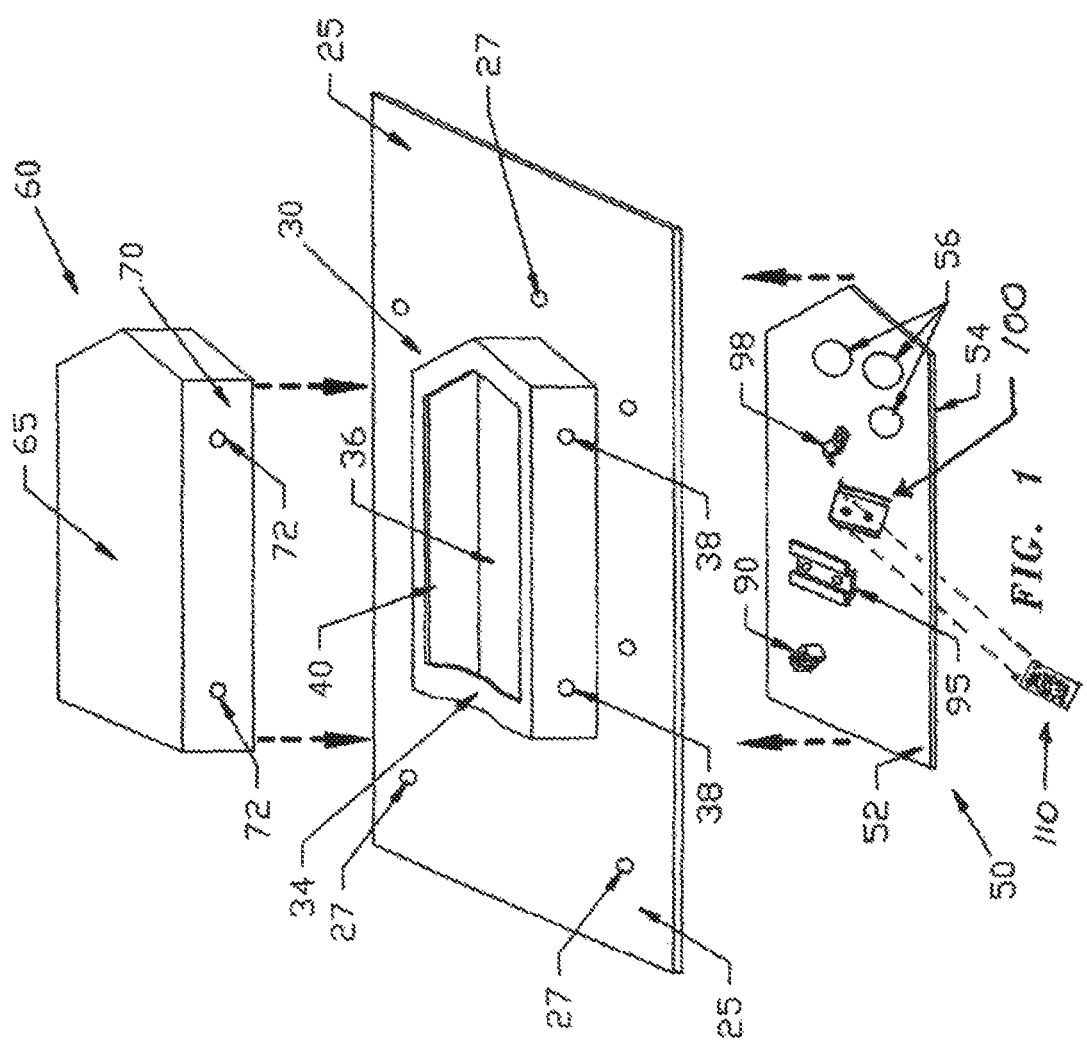
FIG. 1 is a perspective, exploded view of the components of the curb and cap junction box assembly of the present invention

10 Curb and Cap Junction Box Assembly
20 Curb Member
25 Planar Flashing Portion
27 Apertures in Flashing
30 Central Housing Portion 32 Vertical Sidewall
34 Notch in Sidewall
36 Enclosed Space of Central Housing
38 Fastener Apertures
40 Top Opening in Central Housing
45 Bottom Opening in Central Housing
50 Plate Member
52 Top Side of Plate Member
54 Bottom Side of Plate Member
56 Knockout Sections in Plate Member
60 Cap Member
65 Planar Top Portion
70 Peripheral Edge Portion
72 Fastener Apertures
74 U-shaped Cut Out in Edge Portion
76 Fasteners for Cap Member
80 Fasteners of Planar Top Portion
85 Gasket Member of Cap Member
90 Ground Block Member
95 Mounting Rail Member
98 Strain Relief Clip Member
100 Mounting Pan Member for a Circuit Board
110 Circuit Board Member Mounted to Pan Member
C Electrical Conduit Construction The invention is a curb and cap junction box assembly for joined electrical conductors, adapted for receiving and securing joined electrical conductors to a roof structure. The curb and cap junction box assembly comprises a curb member, including a planar flashing portion with a central housing portion extending upwardly from the flashing portion and forming an enclosed space. The central housing portion has top and bottom openings. A plate member, which has a top side facing the bottom opening of the central housing portion, is secured over the bottom opening of the central housing portion. The plate member includes at least one knockout section removable from the plate member, to provide at least one aperture therein. A ground block member is fastened to the top side of the plate member and positioned within the enclosed space of the central housing portion. A mounting pan member is fastened to the top side of the plate member and positioned within the enclosed space of the central housing portion. The mounting pan member is adapted for securing a circuit board member thereto, the circuit board member monitoring and controlling electrical conductors of the junction box assembly. A cap member includes a planar top portion and a peripheral edge portion extending downwardly therefrom. The cap member is sized to fit over the top opening of the central housing portion and reversibly fastened thereto. The curb and cap junction box assembly is secured to a structure by the planar flashing portion. The assembly receives an electrical conductor from interior the structure, through an aperture formed in the plate member by removal of the at least one knockout section. The electrical conductor extends into the enclosed space therein, and through the top opening of the central housing portion of the curb member. The conductor is further routed under the downward extending peripheral edge portion of the cap member and extends exterior the curb and cap junction box assembly.

In a further embodiment of the invention, the curb and cap mounting assembly includes a notch, adjacent the central housing portion top opening, and a gasket member, secured interior the cap member. The gasket member contacts the notch in the central housing portion to seal the opening.

Additionally, a strain relief clip is secured to the plate member and positioned within the enclosed space of the central housing portion.

In yet a further embodiment of the invention, the plate member including a rail member secured to the top side thereof. The rail member is adapted for mounting at least one circuit breaker thereto. The cap member also includes at least one U-shaped cut out, extending from the downwardly extending peripheral edge portion of the cap member toward the planar top portion thereof. The at least one U-shaped cut out is adapted for providing clearance for at least one conduit, with an electrical conductor therein, extending from the central housing portion of the curb member.

Figure 3:
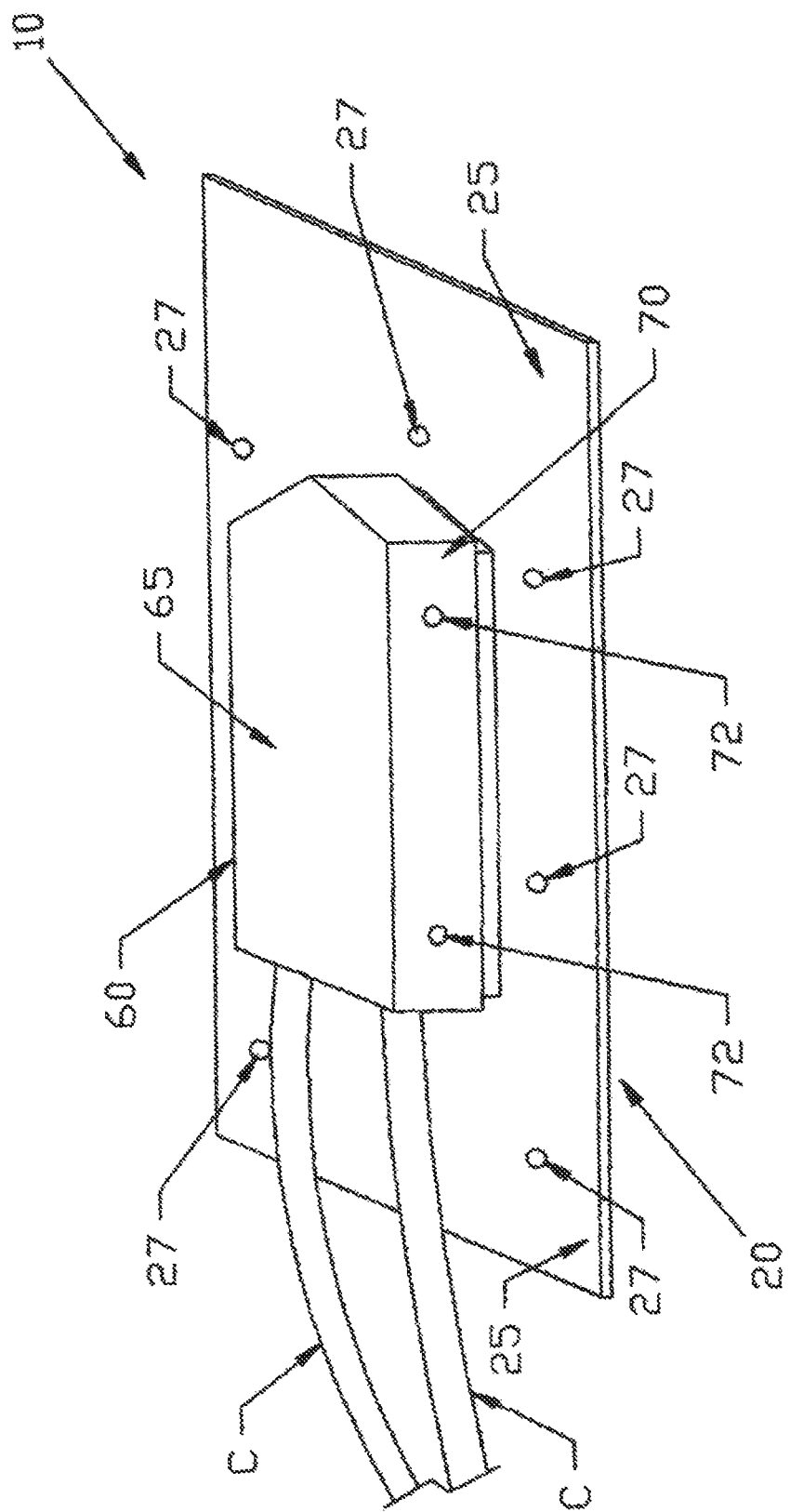
FIG. 3 is a perspective view of the assembled curb and cap junction box assembly of the present invention.
Figure 4:
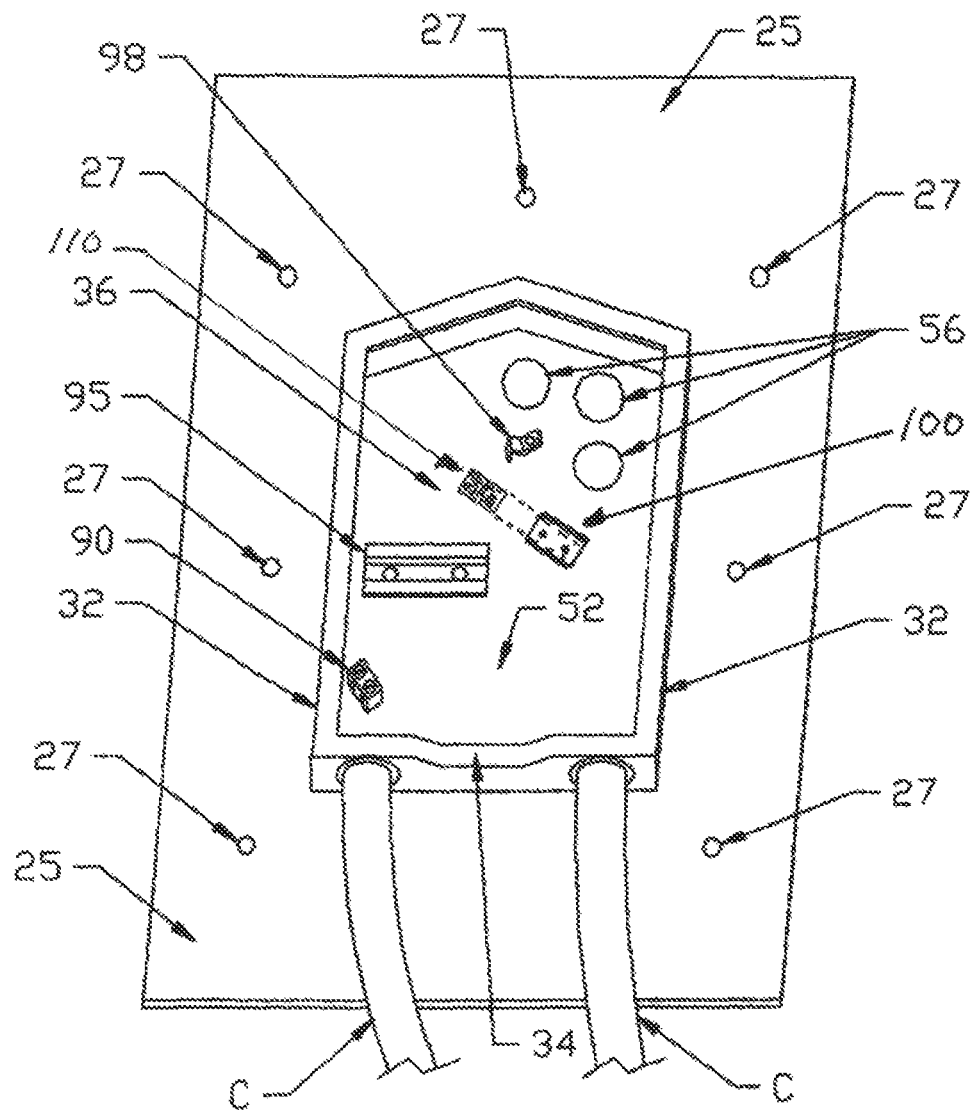
FIG. 4 is a perspective top view of the curb member and attached plate member of the curb and cap junction box assembly of the present invention.

Referring now to FIG. 1, the components of one embodiment of the curb and cap junction box assembly 10 for joined electrical conductors is illustrated. The junction box assembly 10 comprises a curb member 20 including a planar flashing portion 25 with a central housing portion 30 extending upwardly from the flashing portion 25 and forming an enclosed space 36. The central housing portion 30 has a top opening 40 and a bottom opening 45. Preferably, the central housing portion 30 includes at least one vertical sidewall 32 extending from the flashing portion 25. The planar flashing portion 25 includes a plurality of apertures 27 for accepting fasteners (not shown) to secure the junction box assembly 10 to a structure. A plate member 50 is secured over the bottom opening 45 of the central housing portion 30. The plate member 50 has a top side 52 facing and covering the bottom opening 45 of the central housing portion 30. The plate member 50 is permanently fastened to the curb member 20 with, for example, the Norlok fastening technique. The plate member 50 includes at least one knockout section 56, removable from the plate member 50 to provide at least one aperture therein. As seen in FIGS. 1 and 3, the plate member 50 includes three knockout sections 56, each of a different diameter, to accommodate a conduit C of corresponding outer diameter. In the embodiment shown in FIGS. 1 and 4, the knockout sections 56 are of diameter 0.50, 0.75 and 1.00 inch.

A ground block member 90 is fastened to the top side 52 of the attached plate member 50 and is positioned within the enclosed space 36 of the central housing portion 30. In addition, a mounting pan member 100 is fastened to the top side 52 of the attached plate member 50 and is positioned within the enclosed space 36 of the central housing portion 30. The pan member 100 is designed to securely hold a circuit board member 110, which is used for monitoring and controlling various components of the system.

A cap member 60 includes a planar top portion 65 and a peripheral edge portion 70 extending downwardly therefrom. The cap member 60 is sized to fit over the central housing portion 30 to cover the top opening 40 thereof, and is reversibly fastened thereto. The cap member 60 include apertures 72 that align with apertures 38 in the sidewall 32 of central housing portion 30 and accept cap fasteners 76 for reversibly securing the cap member 60 and central housing portion 30 together.

The curb and cap junction box assembly 10 is secured to a structure by the planar flashing portion 25. The assembly 10 receives an electrical conductor from interior the structure, through an aperture formed in the plate member 50, by removal of the at least one knockout section 56 thereof. The electrical conductor, carried by the conduit C, extends into the enclosed space 36 therein. The electrical conductor can be joined to a second electrical conductor with the junction of the conductors maintained within the junction box assembly 10. The ground wire carried by each electrical conductor is fastened to the ground block member 90 to conform to the numerous electrical codes that apply to such junction box assemblies. The second electrical conductor extends through the top opening 40 of the central housing portion 30 of the curb member 20. It continues under the downward extending peripheral edge portion 70 of the cap member 60 and extends exterior the curb and cap junction box assembly 10.

The curb member 20 with the attached plate member 50 and cap member 60 provides an enclosure suitable for high voltage applications. With a ground wire conductor secured to the ground block member 90 that is attached within the junction box assembly 10, any electrical short within the assembly 10 is safely conducted to electrical ground.

Figure 2:
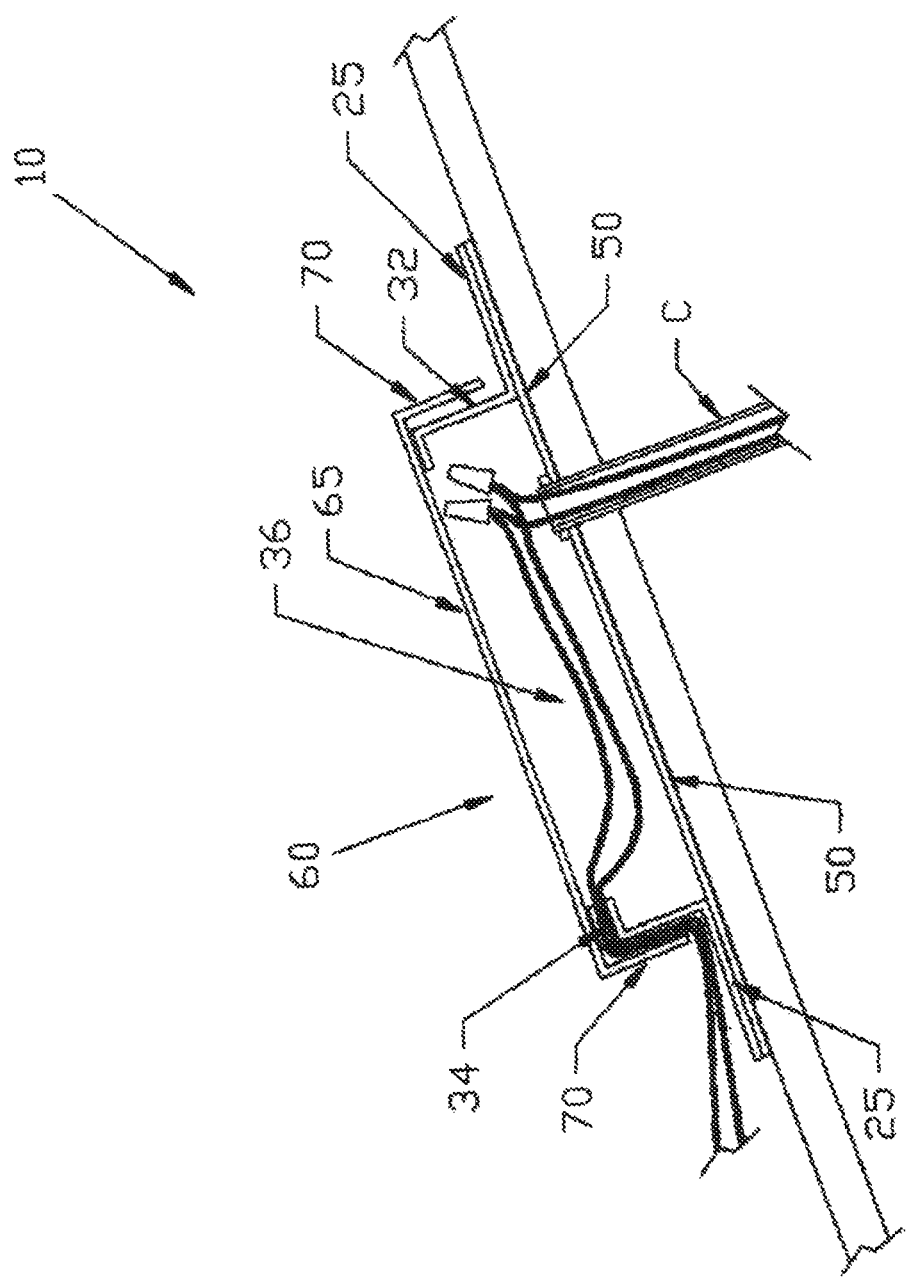
FIG. 2 is a cross sectional view of the assembled curb and cap junction box assembly of the present invention secured to the roof of a structure.

FIG. 2 provides a cross sectional view of th curb and cap junction box assembly 10 secured to the roof of a structure. Electrical conductors are routed from within the structure through a conduit C attached to the plate member 50 and into the enclosed space 36 of the central housing portion 30. The electrical conductors continue under the downward extending peripheral edge portion 70 of the cap member 60 and extend exterior the curb and cap junction box assembly 10.

In a preferred embodiment of the invention, the at least one vertical sidewall 32 of the central housing portion 30 includes a notch 34, adjacent the top opening 40 of the central housing portion 30, to allow easier extension of the electrical conductor from within the junction box assembly 10, as described above. A gasket member 85 is secured interior the cap member 60 such that, with the cap member 60 in place, the gasket member 85 contacts the notch 34 in the at least one vertical sidewall 32 to provide a seal there between. Most preferably, the gasket member 85 is made of foam material or screen material. Also, most preferably, a section of the peripheral edge portion 70 of the cap member 60 is spaced apart from the central housing portion 30 at the at least one vertical sidewall 32 having the notch 34 therein, thereby providing additional clearance for an electrical conductor positioned in the notch 34. Additionally, the downwardly extending peripheral edge portion 70 of the cap member 60 flares outwardly from the central housing portion 30 at an end opposite the planar top portion 65 thereof, to direct rain and snow away from the junction box assembly 10.

In a further embodiment of the invention, the top side 52 of the plate member 50 includes a mounting rail member 95 secured thereto and adapted for mounting at least one circuit breaker thereto. The at least one circuit breaker provides overload protection when connected within an electrical circuit of the conductors within the junction box assembly 10. Additionally, a strain relief clip member 98 is secured to the top side 52 of the plate member 50, with the mounting rail member 95 and strain relief clip member 98 positioned within the enclosed space 36 of the central housing portion 30 with the plate member 50 secured thereto. The strain relief clip member 98 provides an anchor for attachment of the electrical conductors joined within the junction box assembly 10 to prevent inadvertent separation of the joined conductors.

Figure 5:
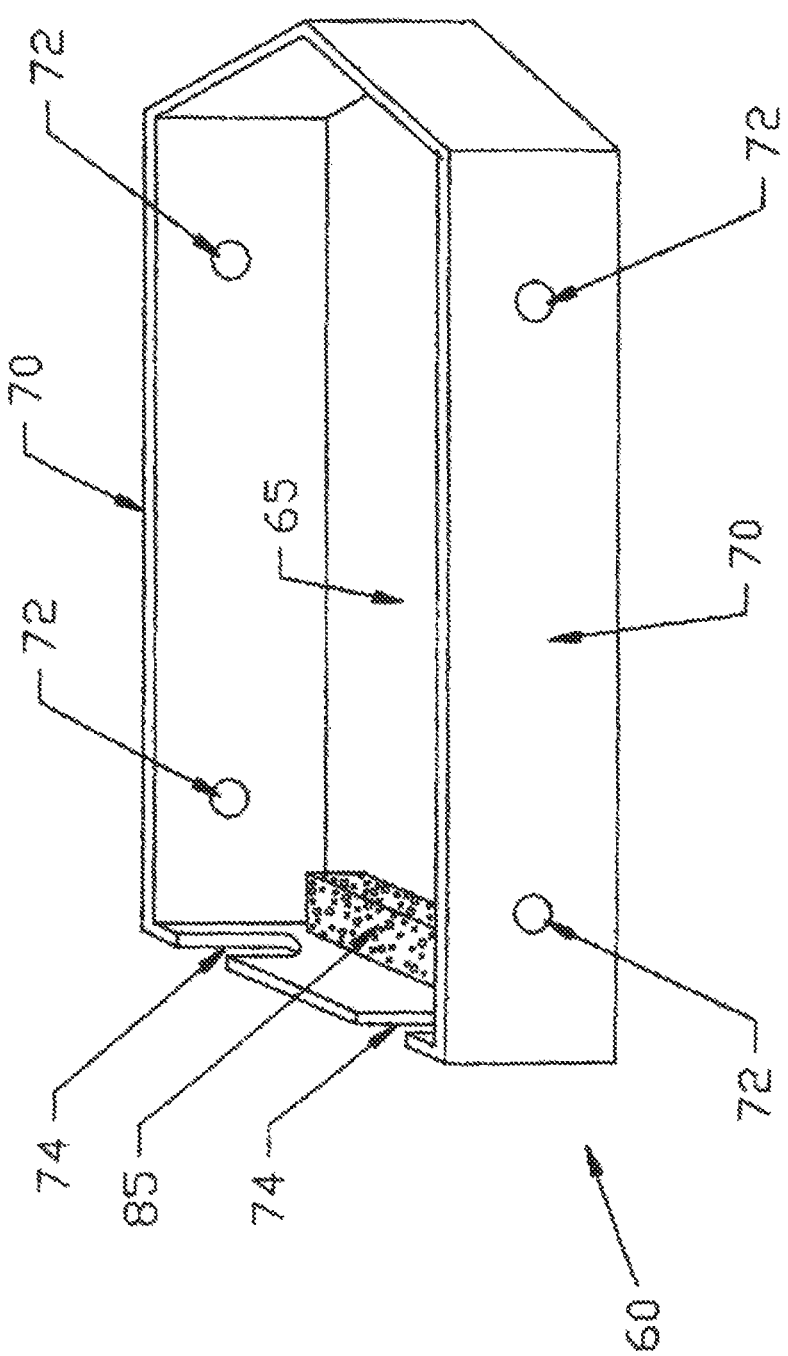
FIG. 5 is a perspective view of the bottom side of the cap member of the curb and cap junction box assembly of the present invention.

In yet a further embodiment of the invention, best seen in FIG. 5, the cap member 30 includes at least one U-shaped cut out 74 extending from the downwardly extending peripheral edge portion 70 of the cap member 60 toward the planar top portion 65 thereof. The at least one U-shaped cut out 74 is adapted for providing clearance for at least one conduit C, with electrical conductor therein, extending from the central housing portion 30 of the curb member 20. In this embodiment, an aperture is drilled in the vertical sidewall 32 of the central housing portion 30, and a suitable conduit C is connected thereto. Electrical conductors within the conduit C extend into the enclosed space 36 of the central housing 30 for joining with other conductors therein. The U-shaped cut out 74 allows the cap member 30 to be securely fastened to the central housing portion 30 to provide a weather-proof enclosed space 36 for the electrical conductor junctions. In the embodiment shown in FIGS. 3 and 4, two conduits C are attached to the vertical sidewall 32 with two corresponding U-shaped cut outs 74 in the peripheral edge portion 70 of the cap member 60.

Preferably, the curb member 20, the plate member 50, and the cap member 60 are all fabricated from 18 gauge steel for durability and powder coated to resist corrosion.

While the invention has been particularly shown and described with reference to preferred embodiments thereof, it will be understood by those skilled in the art that various changes in form and details may be made therein without departing from the spirit and scope of the invention.

I claim:

1. A curb and cap junction box assembly for joined electrical conductors comprising: (a) a curb member including a planar flashing portion with a central housing portion extending upwardly from the flashing portion and forming an enclosed space, the central housing portion having top and bottom openings; (b) a plate member secured over the bottom opening of the central housing portion, the plate member having a top side facing the bottom opening of the central housing portion, the plate member including at least one knockout section removable from the plate member to provide at least one aperture therein; (c) a ground block member fastened to the top side of the plate member and positioned within the enclosed space of the central housing portion; (d) a mounting pan member fastened to the top side of the plate member and positioned within the enclosed space of the central housing portion, the mounting pan member adapted for securing a circuit board member thereto, the circuit board member monitoring and controlling electrical conductors of the junction box assembly; and (e) a cap member having a planar top portion and a peripheral edge portion extending downwardly therefrom, the cap member sized to fit over the top opening of the central housing portion and reversibly fastened thereto; (f) whereby, the curb and cap junction box assembly secured to a structure by the planar flashing portion receives an electrical conductor from interior the structure, through an aperture formed in the plate member by removal of the at least one knockout section, and into the enclosed space therein, the electrical conductors extendable through the top opening of the central housing portion of the curb member and under the downward extending peripheral edge portion of the cap member and extending exterior the curb and cap junction box assembly.

2. The curb and cap junction box assembly of claim 1, wherein the central housing portion includes at least one vertical sidewall extending from the flashing portion.

3. The curb and cap junction box assembly of claim 2, wherein the at least one vertical sidewall of the central housing portion includes a notch adjacent the top opening of the central housing portion.

4. The curb and cap junction box assembly of claim 3, wherein a section of the cap member peripheral edge portion is spaced apart from the central housing portion at the at least one vertical sidewall having the notch therein.

5. The curb and cap junction box assembly of claim 3, further including a gasket member secured interior the cap member, the gasket member contacting the notch in the at least one vertical sidewall adjacent the top opening of the central housing portion.

6. The curb and cap junction box assembly of claim 5, wherein the gasket member is selected from the group consisting of foam material and screen material.

7. The curb and cap junction box assembly of claim 1, wherein the downwardly extending peripheral edge portion of the cap member flares outwardly from the central housing portion at an end opposite the planar top portion thereof.

8. The curb and cap junction box assembly of claim 1, wherein the top side of the plate member includes a rail member secured thereto and adapted for mounting at least one circuit breaker thereto and a strain relief clip member secured thereto, the rail member and strain relief clip member positioned within the enclosed space of the central housing portion.

9. The curb and cap junction box assembly of claim 1, further including at least one U-shaped cut out extending from the downwardly extending peripheral edge portion of the cap member toward the planar top portion thereof, the at least one U-shaped cut out adapted for providing clearance for at least one conduit, with electrical conductor therein, extending from the central housing portion of the curb member.

10. A curb and cap junction box assembly for joined electrical conductors comprising: (a) a curb member including a planar flashing portion with a central housing portion extending upwardly from the flashing portion and forming an enclosed space, the central housing portion having top and bottom openings, the central housing portion including at least one vertical sidewall extending from the flashing portion and containing a notch adjacent the central housing portion top opening; (b) a plate member secured over the bottom opening of the central housing portion, the plate member having a top side facing the bottom opening of the central housing portion, the plate member top side including a rail member secured thereto and adapted for mounting at least one circuit breaker thereto, a strain relief clip member secured thereto, and at least one knockout section removable from the plate member to provide at least one aperture therein; (c) a ground block member fastened to the top side of the plate member and positioned within the enclosed space of the central housing portion; (d) a mounting pan member fastened to the top side of the plate member and positioned within the enclosed space of the central housing portion; (e) a circuit board member secured to the mounting pan member, the circuit board member adapted for monitoring and controlling electrical conductors of the junction box assembly; and (f) a cap member having a planar top portion and a peripheral edge portion extending downwardly therefrom, the cap member sized to fit over the top opening of the central housing portion and reversibly fastened thereto, the cap member peripheral edge portion is spaced apart from the central housing portion at the least one vertical sidewall having the notch therein, the cap member including at least one U-shaped cut out extending from the downwardly extending peripheral edge portion of the cap member toward the planar top portion thereof, the at least one U-shaped cut out adapted for providing clearance for at least one conduit, with electrical conductor therein, extending from the central housing portion of the curb member; (g) whereby, the curb and cap junction box assembly secured to a structure by the planar flashing portion receives an electrical conductor from interior the structure, through an aperture formed in the plate member by removal of the at least one knockout section, and into the enclosed space therein, the electrical conductors extendable through the top opening of the central housing portion of the curb member and under the downward extending peripheral edge portion of the cap member and extending exterior the curb and cap junction box assembly.

11. The curb and cap junction box assembly of claim 10, further including a gasket member secured interior the cap member, the gasket member contacting the notch in the at least one vertical sidewall adjacent the top opening of the central housing portion, the gasket member selected from the group consisting of foam material and screen material.

12. The curb and cap junction box assembly of claim 10, wherein the downwardly extending peripheral edge portion of the cap member flares outwardly from the central housing portion at an end opposite the planar top portion thereof.

\* \* \* \* \*